United States Patent
Trail et al.

(10) Patent No.: US 10,349,038 B2
(45) Date of Patent: Jul. 9, 2019

(54) DYNAMIC CONTROL OVER STRUCTURED ILLUMINATION INTENSITY

(71) Applicant: Facebook Technologies, LLC, Menlo Park, CA (US)

(72) Inventors: Nicholas Daniel Trail, Bothell, WA (US); Stephen James McNally, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 279 days.

(21) Appl. No.: 15/391,812

(22) Filed: Dec. 27, 2016

(65) Prior Publication Data

US 2017/0195653 A1 Jul. 6, 2017

Related U.S. Application Data

(60) Provisional application No. 62/274,657, filed on Jan. 4, 2016.

(51) Int. Cl.

| | |
|---|---|
| *G02F 1/1335* | (2006.01) |
| *G02F 1/13* | (2006.01) |
| *G06T 7/00* | (2017.01) |
| *G02B 6/26* | (2006.01) |
| *H01J 43/00* | (2006.01) |
| *G09G 5/00* | (2006.01) |
| *H04N 13/254* | (2018.01) |
| *H04N 13/344* | (2018.01) |
| *G02F 1/133* | (2006.01) |
| *H04N 13/366* | (2018.01) |

(52) U.S. Cl.
CPC ....... *H04N 13/254* (2018.05); *G02F 1/13306* (2013.01); *G02F 1/133528* (2013.01); *H04N 13/344* (2018.05); *H04N 13/366* (2018.05)

(58) Field of Classification Search
CPC .......... H04N 13/254; G06T 7/00; G02B 6/26; G02B 27/101; H01S 3/091; H01J 43/00; G09G 5/00; G09G 3/26; G02F 1/3335
USPC ......................................................... 348/46
See application file for complete search history.

(56) References Cited

U.S. PATENT DOCUMENTS

| | | | | |
|---|---|---|---|---|
| 4,857,908 A | * | 8/1989 | Kogure ................... | G09F 11/26 345/105 |
| 6,057,909 A | * | 5/2000 | Yahav ................. | G01C 11/025 313/103 CM |

(Continued)

*Primary Examiner* — Patricia I Young
(74) *Attorney, Agent, or Firm* — Fenwick & West LLP

(57) ABSTRACT

A depth camera assembly (DCA) determines depth information for a scene in a field of view of the DCA. The DCA includes a structured light (SL) illuminator, a camera, and a controller. The SL illuminator includes a source assembly, a SL element, a liquid crystal (LC) array, and a polarizer. The source assembly generates light, and the SL element generates a SL pattern using the generated light source. The LC array includes a plurality of addressable cells configured to polarize the SL pattern in accordance with adjustment instructions. The polarizer attenuates portions of the SL pattern based on the polarization of the portions of the SL pattern. The camera captures an image of the SL pattern, and the controller identifies portions of the image that are saturated and generates adjustment instructions based in part on the identified portions of the image, and provides the adjustment instructions to the LC array.

17 Claims, 6 Drawing Sheets

(56) References Cited

U.S. PATENT DOCUMENTS

| | | | | |
|---|---|---|---|---|
| 9,860,522 B2* | 1/2018 | Lapstun | ............... | H04N 13/302 |
| 2004/0240777 A1* | 12/2004 | Woodgate | .......... | G02B 27/2214 |
| | | | | 385/16 |
| 2006/0152651 A1* | 7/2006 | Negley | ................ | G02B 5/0247 |
| | | | | 349/64 |
| 2008/0204438 A1* | 8/2008 | Song | ................... | G09G 3/3225 |
| | | | | 345/207 |
| 2010/0290108 A1* | 11/2010 | Tokita | ................... | H01S 3/2316 |
| | | | | 359/345 |
| 2013/0050833 A1* | 2/2013 | Lewis | ............... | G06K 9/00604 |
| | | | | 359/630 |
| 2016/0371845 A1* | 12/2016 | Yasovsky | .......... | G02B 27/4205 |

* cited by examiner

US 10,349,038 B2

DYNAMIC CONTROL OVER STRUCTURED ILLUMINATION INTENSITY

CROSS REFERENCE TO RELATED APPLICATIONS

This application claims priority to and the benefit of U.S. Provisional Patent Application No. 62/274,657 filed on Jan. 4, 2016, which is incorporated by reference in its entirety.

BACKGROUND

The present disclosure generally relates to determining three dimensional position information of objects, and specifically to dynamically controlling structured light illumination intensity such that it falls within a prescribed dynamic range.

Structured illumination provides for a class of techniques to recover three-dimensional information for a scene. For instance, a captured image of a scene illuminated with a structured light pattern may be analyzed to determine the three-dimensional position information of the objects present in the captured image. The analysis of the captured image may include analyzing the distortion of the structured light pattern to determine the distance between the objects reflecting the structured light pattern and the imaging device used to capture the image. The ability to recover both close and far, or low and high reflectivity, objects in the same scene can be challenging due to the limited dynamic range in any actual camera setup. Accordingly, an image of the scene may include portions (pixels saturated) that are not suitable for recovery of three-dimensional information.

SUMMARY

A depth camera assembly (DCA) configured to determine depth information for a scene in a field of view of the DCA. The DCA includes a structured light source, a camera, and a controller. The structured light (SL) source includes a source assembly, a SL element, a liquid crystal array, and a polarizer. The source assembly generates a light source. The SL element is positioned in front of the source assembly and generates a structured light pattern using the generated light source. The liquid crystal array is positioned in front of the SL element and is capable of changing a polarization of portions of the structured light pattern generated by the SL element. The polarizer is positioned in front of the liquid crystal array and attenuates portions of the light pattern based on the polarization of the portions of the light pattern. The attenuated light pattern is then projected onto a scene. The camera is configured to capture an image of the attenuated light pattern scattered and/or reflected from objects within the scene that are within the field of view of the camera. The controller controls the camera and the structured light illuminator. In some embodiments, the DCA is part of a head-mounted display.

To determine the three-dimensional position information of objects in a scene, the scene is illuminated with the structured light patter. An image of the illuminated scene is captured and portions of the image that are saturated are identified. Based on the identified portions of the captured image that are saturated, attenuation information is determined and portions of the structured light pattern are attenuated based on the determined attenuation information. The attenuation of the portions of the structured light pattern may be performed by driving portions of the liquid crystal array based on the determined attenuation information.

Figure 1:
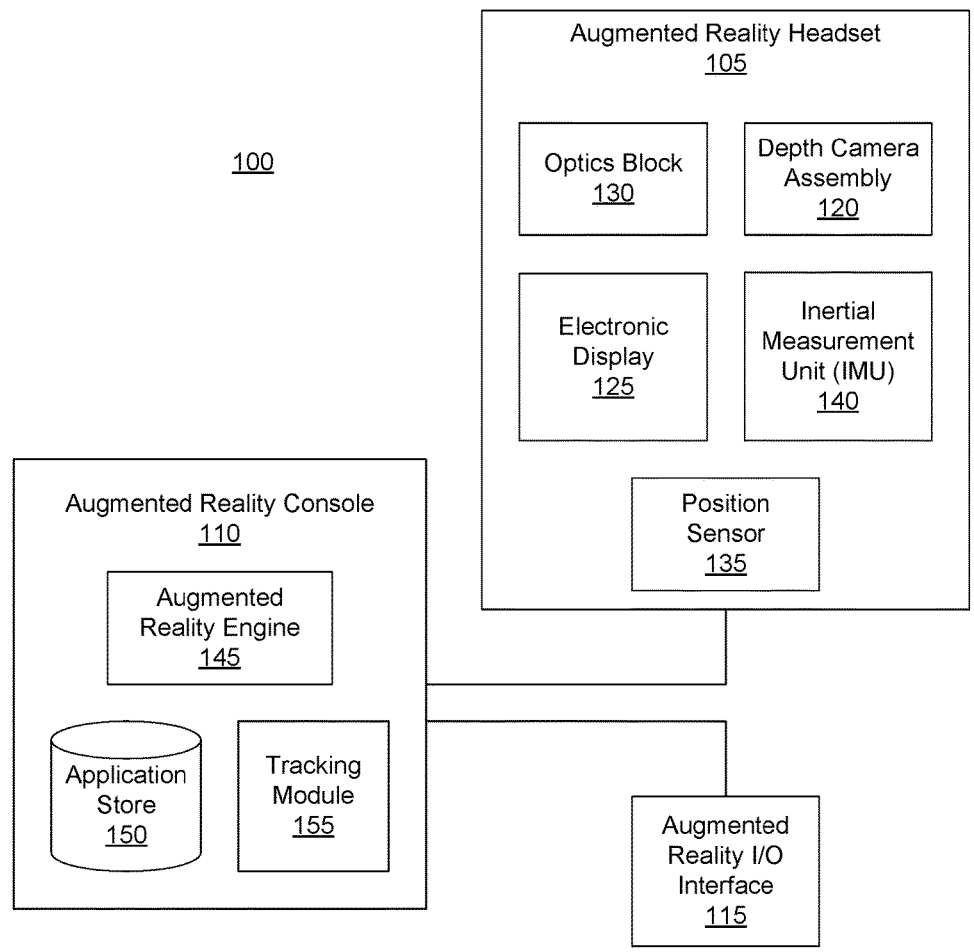
FIG. 1 is a block diagram of an augmented reality system environment in which an augmented reality console operates, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAIL DESCRIPTION

Configuration Overview

An augmented reality (AR) headset includes a depth camera assembly (DCA) for determining three dimensional position information of objects in a scene. In some embodiments, the AR headset may also be used as a virtual reality (VR) headset. The DCA is configured to illuminate a scene with controlled illumination, such as temporally modulated light (Time of Flight) or structured light (SL) as an example. A scene is a real world environment onto which the controlled illumination is projected by the DCA. For example, a scene could be an interior of a room enclosing multiple objects that are illuminated. The DCA then images the illuminated scene, and the image may then be used to determine depth information for the illuminated scene.

In some instances an illuminated scene may have a dynamic range that exceeds that of the DCA. For example, different objects in the scene could have different received signal strengths (e.g., vary due to distance from DCA, vary due to reflectivity of the object, etc.), and the difference may exceed the dynamic range of the DCA. Therefore one or more of the bright objects in an image of the illuminated scene may be saturated. For example, an illumination signal (e.g., SL) reflected from hands of a user may be saturated relative to a signal reflected from an object farther away from the DCA which is not saturated. Saturation occurs when pixels lose the ability to hold additional charge (e.g., if each individual pixel can be thought of as a well of electrons that is filled with incident light, then saturation refers to the condition where the well is full.). Additionally, the excess charge may spread into adjacent pixels and cause them also to saturate (referred to as blooming). Saturation and blooming result in degradation of the resulting image as it makes it difficult, if not impossible, to resolve individual scene characteristics, such as edges or SL elements. Accordingly, saturation and blooming may negatively affect depth determination, and if not addressed, may prevent depth determination for a saturated portion of an image.

The DCA identifies portions of an image that are or may be saturated. The DCA is configured to selectively adjust an illumination intensity of the emitted pattern or flood illumination (e.g., flash) such that, in a subsequent image frame the identified portions are no longer saturated. The DCA includes a source assembly, an optional input polarizer or waveplate (dependent upon the source properties), an SL element (such as a diffractive optical element or microlens array), a liquid crystal array, and an output polarizer. An illumination (pattern) is generated and is incident on the liquid crystal array. The liquid crystal array includes a plurality of individually addressable cells that each transmit and possibly rotate the polarization of the respective illumination. Accordingly, different portions of the light emitted from the liquid crystal array may have different polarizations. The polarizer is a linear polarizer with a specific polarization orientation. Accordingly, the amount of illumination power incident on the polarizer that is transmitted is based in part on how closely its polarization is to that of the specific polarization orientation. Accordingly, the DCA is able to emit SL of varying intensities by controlling amounts that each cell in the liquid crystal array rotates the polarization of incident illumination. In this manner, the DCA is able to eliminate saturation in captured images, which can then be used to determine depth information over a wider dynamic range.

System Overview

FIG. 1 is a block diagram of one embodiment of an augmented reality (AR) system environment 100 in which an AR console 110 operates. As used herein, an AR system environment 100 may also include virtual reality system environments that present users with virtual environments with which the user may interact. The AR system environment 100 shown by FIG. 1 comprises an AR headset 105 and an AR input/output (I/O) interface 115 that are each coupled to an AR console 110. While FIG. 1 shows an example system 100 including one AR headset 105 and one AR I/O interface 115, in other embodiments any number of these components may be included in the AR system environment 100. For example, there may be multiple AR headsets 105 each having an associated AR I/O interface 115, with each AR headset 105 and AR I/O interface 115 communicating with the AR console 110. In alternative configurations, different and/or additional components may be included in the AR system environment 100. Additionally, functionality described in conjunction with one or more of the components shown in FIG. 1 may be distributed among the components in a different manner than described in conjunction with FIG. 1 in some embodiments. For example, some or all of the functionality of the AR console 110 is provided by the AR headset 105.

The AR headset 105 is a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the AR headset 105, the AR console 110, or both, and presents audio data based on the audio information. An embodiment of the AR headset 105 is further described below in conjunction with FIGS. 2 and 3. The AR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The AR headset 105 includes a depth camera assembly (DCA) 120, an electronic display 125, an optics block 130, one or more position sensors 135, and an inertial measurement Unit (IMU) 140. Some embodiments of The AR headset 105 have different components than those described in conjunction with FIG. 1. Additionally, the functionality provided by various components described in conjunction with FIG. 1 may be differently distributed among the components of the AR headset 105 in other embodiments.

The DCA 120 illuminates a scene to help assist with depth information retrieval. The DCA 120 emits the illumination in a specific band. In some embodiments, the light emitted is in a band not visible to a user (e.g., infrared). However, in other embodiments, the emitted light is in a band of light visible to the user. This light can be either quasi-uniform (either for general illumination or time-of-flight characteristics) or contain a spatial pattern such as that for structured light (SL), which can include a collection of structured light elements. A structured light element may be, e.g., one or more dots, one or more sinusoids, one or more lines, or some other shape or collection of shapes. The SL may have a specified pattern, such as a symmetric or a quasi-random grid. Based on deformation of the SL when projected onto surfaces and/or relative brightness of the reflected SL, depth and surface information of objects within the scene may be determined through triangulation techniques. As discussed in detail below with regard to FIGS. 3-5, the DCA 120 is able to selectively adjust the intensity of different portions of the emitted light that illuminates the scene to ensure that each element in the retrieved scene image is not saturated. For example, the DCA 120 can concurrently project light at a particular intensity onto a particular object in the scene and project light at a different intensity onto a different object in the scene.

The DCA 120 is configured to capture one or more images of a scene using one or more imaging devices. A scene is a real world environment onto which light (e.g., SL) is projected by the DCA. The one or more imaging device may be, e.g., a charge coupled device (CCD), a complementary metal-oxide-semiconductor (CMOS) imager, other light sensitive device, or some combination thereof. The imaging devices capture and record particular ranges of wavelengths of light (i.e., "bands" of light) including the light projected by the DCA. Bands of light captured by an imaging device may include, e.g., a visible band (~380 nm to 750 nm), an infrared (IR) band (~750 nm to 2200 nm), an ultraviolet band (10 nm to 380 nm), another portion of the electromagnetic spectrum used by the DCA, or some combination thereof. In some embodiments, an imaging device captures images including light in the visible band and in the infrared band.

The DCA 120 determines if any portion of the image is saturated. The DCA 120 selectively attenuates the light that illuminates portions of the scene corresponding to the portions identified as being saturated in the image. The amount of attenuation is determined to prevent saturation of the portions of the scene in a subsequent image while still having a strong signal to noise (SNR) value (i.e., close to saturation, such as 80% well-fill capacity, but not saturated). Subsequent image frames of the illuminated scene are accordingly within the dynamic range of the DCA 120 and may be used to determine depth information for the illuminated scene. The DCA 120 is discussed in detail below with regard to FIGS. 2-5.

The electronic display 125 displays 2D or 3D images to the user in accordance with data received from the AR console 110. In various embodiments, the electronic display 125 comprises a single electronic display element or multiple electronic displays elements (e.g., a display element for each eye of a user). Examples of the electronic display element include: a liquid crystal display (LCD), an organic light emitting diode (OLED) display, an active-matrix organic light-emitting diode display (AMOLED), some other display, or some combination thereof.

The optics block 130 magnifies image light received from the electronic display 125, corrects optical errors associated with the image light, and presents the corrected image light to a user of the AR headset 105. In various embodiments, the optics block 130 includes one or more optical elements. Example optical elements included in the optics block 130 include: an aperture, a Fresnel lens, a convex lens, a concave lens, a filter, a reflecting surface, or any other suitable optical element that affects image light. Moreover, the optics block 130 may include combinations of different optical elements. In some embodiments, one or more of the optical elements in the optics block 130 may have one or more coatings, such as anti-reflective coatings.

Magnification and focusing of the image light by the optics block 130 allows the electronic display 125 to be physically smaller, weigh less and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel distortions, pincushion distortions, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the AR headset 105 based on measurement signals received from one or more of the position sensors 135 and from ambient light levels received from the DCA 120. A position sensor 135 generates one or more measurement signals in response to motion of the AR headset 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the AR headset 105 relative to an initial position of the AR headset 105. For example, the position sensors 135 include multiple accelerometers to measure translational motion (forward/back, up/down, left/right) and multiple gyroscopes to measure rotational motion (e.g., pitch, yaw, and roll). In some embodiments, the IMU 140 rapidly samples the measurement signals and calculates the estimated current position of the AR headset 105 from the sampled data. For example, the IMU 140 integrates the measurement signals received from the accelerometers over time to estimate a velocity vector and integrates the velocity vector over time to determine an estimated current position of a reference point on the AR headset 105. Alternatively, the IMU 140 provides the sampled measurement signals to the AR console 110, which interprets the data to reduce error. The reference point is a point that may be used to describe the position of the AR headset 105. The reference point may generally be defined as a point in space or a position related to the AR headset's 105 orientation and position.

The IMU 140 receives one or more parameters from the AR console 110. As further discussed below, the one or more parameters are used to maintain tracking of the AR headset 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the AR headset 105, the IMU 140 may be a dedicated hardware component. In other embodiments, the IMU 140 may be a software component implemented in one or more processors.

The AR I/O interface 115 is a device that allows a user to send action requests and receive responses from the AR console 110. An action request is a request to perform a particular action. For example, an action request may be an instruction to start or end capture of image or video data or an instruction to perform a particular action within an application. The AR I/O interface 115 may include one or more input devices. Example input devices include: a keyboard, a mouse, a game controller, or any other suitable device for receiving action requests and communicating the action requests to the AR console 110. An action request received by the AR I/O interface 115 is communicated to the AR console 110, which performs an action corresponding to the action request. In some embodiments, the AR I/O interface 115 includes an IMU 140, as further described above, that captures calibration data indicating an estimated position of the AR I/O interface 115 relative to an initial position of the AR I/O interface 115. In some embodiments, the AR I/O interface 115 may provide haptic feedback to the user in accordance with instructions received from the AR console 110. For example, haptic feedback is provided when an action request is received, or the AR console 110 communicates instructions to the AR I/O interface 115 causing the AR I/O interface 115 to generate haptic feedback when the AR console 110 performs an action.

The AR console 110 provides content to the AR headset 105 for processing in accordance with information received from one or more of: the DCA 120, the AR headset 105, and the AR I/O interface 115. In the example shown in FIG. 1, the AR console 110 includes an application store 150, a tracking module 155 and an AR engine 145. Some embodiments of the AR console 110 have different modules or components than those described in conjunction with FIG. 1. Similarly, the functions further described below may be distributed among components of the AR console 110 in a different manner than described in conjunction with FIG. 1.

The application store 150 stores one or more applications for execution by the AR console 110. An application is a group of instructions, that when executed by a processor, generates content for presentation to the user. Content generated by an application may be in response to inputs received from the user via movement of the AR headset 105 or the AR I/O interface 115. Examples of applications include: gaming applications, conferencing applications, video playback applications, or other suitable applications.

The tracking module 155 calibrates the AR system environment 100 using one or more calibration parameters and may adjust one or more calibration parameters to reduce error in determination of the position of the AR headset 105 or of the AR I/O interface 115. For example, the tracking module 155 communicates a calibration parameter to the DCA 120 to adjust the focus or power output of the DCA 120 to more accurately determine positions of the depth (such as from SL) elements captured by the DCA 120. Calibration performed by the tracking module 155 also accounts for information received from the IMU 140 in the AR headset 105 and/or an IMU 140 included in the AR I/O interface 115. Additionally, if tracking of the AR headset 105 is lost (e.g., the DCA 120 loses line of sight of at least a threshold number of SL elements), the tracking module 140 may re-calibrate some or all of the AR system environment 100.

The tracking module 155 tracks movements of the AR headset 105 or of the AR I/O interface 115 using sensor data information from the DCA 120, the one or more position sensors 135, the IMU 140 or some combination thereof. For example, the tracking module 155 determines a position of a reference point of the AR headset 105 in a mapping of a scene based on information from the AR headset 105. The tracking module 155 may also determine positions of the reference point of the AR headset 105 or a reference point of the AR I/O interface 115 using data indicating a position of the AR headset 105 from the IMU 140 or using data indicating a position of the AR I/O interface 115 from an IMU 140 included in the AR I/O interface 115, respectively. Additionally, in some embodiments, the tracking module 155 may use portions of data indicating a position or the AR headset 105 from the IMU 140 as well as representations of the scene from the DCA 120 to predict a future location of the AR headset 105. The tracking module 155 provides the estimated or predicted future position of the AR headset 105 or the AR I/O interface 115 to the AR engine 145.

The AR engine 145 generates a 3D mapping of a scene based on the deformation of images and/or relative brightness of the scene images received from the AR headset 105. The AR engine 145 also executes applications within the AR system environment 100 and receives position information, acceleration information, velocity information, predicted future positions, or some combination thereof, of the AR headset 105 from the tracking module 155. Based on the received information, the AR engine 145 determines content to provide to the AR headset 105 for presentation to the user. For example, if the received information indicates that the user has looked to the left, the AR engine 145 generates content for the AR headset 105 that mirrors the user's movement in a virtual environment or in an environment augmenting the scene with additional content. Additionally, the AR engine 145 performs an action within an application executing on the AR console 110 in response to an action request received from the AR I/O interface 115 and provides feedback to the user that the action was performed. The provided feedback may be visual or audible feedback via the AR headset 105 or haptic feedback via the AR I/O interface 115.

Figure 2:
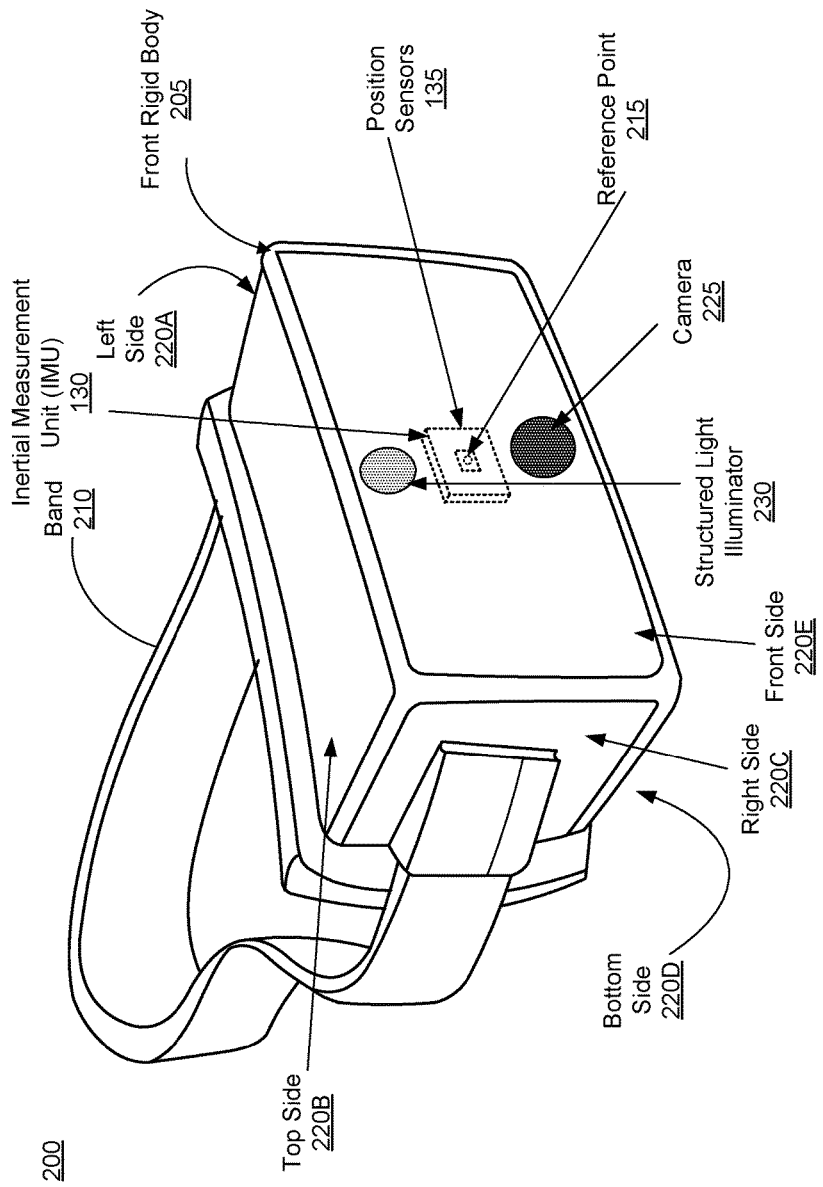
FIG. 2 is a wire diagram of an augmented reality headset, in accordance with an embodiment.

FIG. 2 is a wire diagram of one embodiment of an AR headset 200. The AR headset 200 is an embodiment of the AR headset 105, and includes a front rigid body 205, a band 210, a reference point 215, a left side 220A, a top side 220B, a right side 220C, a bottom side 220D, and a front side 220E. The AR headset 200 shown in FIG. 2 also includes an embodiment of a depth camera assembly (DCA) 120 comprising a camera 225 and an illuminator, for example, shown as a structured light (SL) illuminator 230 configured to project a known pattern (e.g., a grid, a series of lines, a pattern of symmetrical or quasi-randomly oriented dots) onto the scene, which are further described below in conjunction with FIG. 3. The front rigid body 205 includes one or more electronic display elements of the electronic display 125 (not shown), the IMU 130, the one or more position sensors 135, and the reference point 215.

Figure 3:
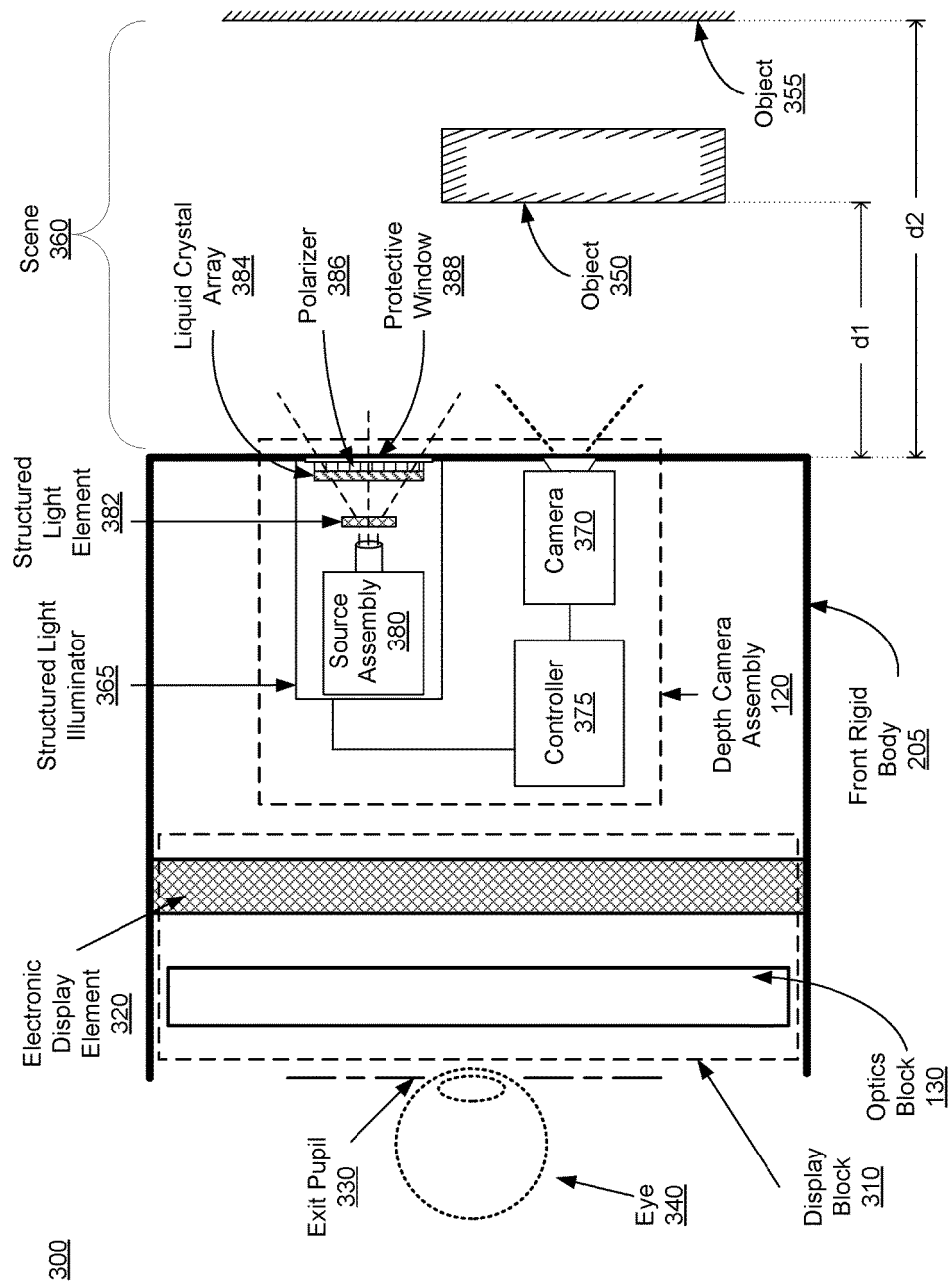
FIG. 3 is a cross section of the front rigid body of the augmented reality headset of FIG. 2, according to one embodiment.

FIG. 3 is a cross section 300 of the front rigid body 205 of the AR headset 200 depicted in FIG. 2, according to an embodiment. As shown in FIG. 3, the front rigid body includes a display block 310 and the DCA 120. The display block 310 includes an electronic display element 320 of the electronic display 115, and the optics block 130. The electronic display element 320 emits image light toward the optics block 130. The optics block 130 magnifies the image light, and in some embodiments, also corrects for one or more additional optical errors (e.g., distortion, astigmatism, etc.). The optics block 130 directs the image light to an exit pupil 330 for presentation to the user. The exit pupil 330 is the location of the front rigid body 205 where a user's eye 340 is positioned. For purposes of illustration, FIG. 3 shows a cross section 300 associated with a single eye 340, accordingly, a separate optics block 130 and/or electronic display element 320 may be used to provide altered image light to other eye of the user. In some embodiments, the DCA 120 or some components of the DCA 120 are in line with the user's eye 340. In other embodiments, the components of the DCA 120 are not in line with the user's eye 340.

The DCA 120 determines depth information (e.g., three dimensional position information) of objects (e.g., object 350 and 355) in a scene 360. The DCA 120 includes an illuminator, which can be either relatively uniform (such as traditionally utilized in time-of-flight (ToF) methods) or textured/patterned (such as structured light (SL)) techniques. For purposes of this description, the illuminator is referenced and referred to as a SL illuminator 365, but it could serve to function for ToF or stereo-assisted techniques as well. In general, the DCA 120 includes a SL illuminator 365, a camera 370, and a controller 375. Some embodiments of the DCA 120 have different components than those described in conjunction with FIG. 3. Similarly, the functions described in conjunction with FIG. 3 may be distributed among the components of the DCA 120 in different manners in other embodiments.

The SL illuminator 365 generates and projects SL onto the scene 360. For instance, the SL illuminator 365 may generate a symmetric or quasi-random dot pattern including multiple dots. In other embodiments, the SL illuminator 365 may generate a mesh or a grid pattern including multiple horizontal and/or vertical bars. The SL illuminator 365 includes a source assembly 380 (with associated optics for collimation or divergence control), an optional input polarizer or waveplate, a SL element 382, a liquid crystal array 384, an output polarizer 386, and a protective window 388 (which could be the polarizer itself, if of appropriate structural properties).

The source assembly 380 generates light. The source assembly 380 may generate a continuous beam of light or a pulsed beam of light. For instance, the source assembly 380 may generate light pulses at the frame rate of the camera 370 (e.g., 100 Hz) or some other rate, such as in the megahertz range, useful for ToF imagery. The source assembly 380 may generate light in one or more bands like, e.g., a visible band (~380 nm to 750 nm), an infrared (IR) band (~750 nm to 2200 nm), an ultraviolet band (10 nm to 380 nm), another portion of the electromagnetic spectrum, or some combination thereof. The generated light may be coherent light or semi-coherent light. In some embodiments the generated light may be incoherent.

The SL element 382 generates SL using the light from the source assembly 380. The SL element 382 may be, e.g., an apodization and/or phase mask, a diffractive element, birefringent plate, some other optical element that when illuminated by the source assembly 380 light source outputs SL, or some combination thereof. For example, the SL element 382 may be a mask including transparent (or translucent) regions and opaque regions. The opaque portions of the mask, if present, blocks portions of the light source to generate the SL. As another example, the SL element 382 could be diffractive in nature to generate the SL pattern.

The liquid crystal array 384 is configured to selectively change the polarization of specific portions of the SL generated by the SL element 382. The liquid crystal array 384 includes a plurality of independently addressable cells. Each cell may be addressed to change the crystal orientation of the liquid crystal inside the cell of the liquid crystal array 384. For instance, a voltage may be applied to the liquid crystal of a cell to change the crystal orientation of the liquid crystal inside the cell. By changing the crystal orientation of the liquid crystal, the polarization of light that passes through the liquid crystal is also changed. For example, if a crystal orientation of a liquid crystal cell is rotated through an appropriate voltage setting, then the polarization of light passing through the liquid crystal cell is also rotated by a comparable amount, over the range of 0 degrees (no change to incoming polarization state) to approximately 90 degrees.

The liquid crystal array 384 is fully illuminated by the SL emitted by the SL element 384. In this manner, different portions of the SL can be resolved by each cell of the liquid crystal array 384. In some embodiments, the liquid crystal array 384 is located approximately 3 millimeters (mm) from the SL element 382, which allows for the source pattern to separate (specifically if there is a common origination point for the source). In other embodiments, the source assembly 380 could be generated through discrete source elements, such as with a 1 or 2-dimensional array of edge emitting or vertical-cavity surface-emitting laser (VCSEL), which would not require as much separation distance as described above.

The output polarizer 386 polarizes the SL output by the liquid crystal array 384. The output polarizer 386 is a linear polarizer that has a specific polarization orientation. The output polarizer may be, e.g., an absorptive polarizer, a wire-grid polarizer, or some other device that linearly polarizes light. The amount of incident SL on the output polarizer 386 that is transmitted is based in part on how closely its polarization is to that of the specific polarization orientation. For example, incident SL having a polarization equal to the specific polarization orientation may have very high transmittance (e.g., 99%), however, incident SL whose polarization is orthogonal to the specific polarization orientation would have very low transmittance (e.g., less than 1%).

The light transmitted from each cell in the liquid crystal array 384 corresponds to a respective portion of the illuminated scene. The liquid crystal array 384 may selectively rotate the polarization of the SL on a cell by cell basis. Accordingly, the liquid crystal array 384 in conjunction with output polarizer 386 can be used to reduce the illumination intensity of specific portions of SL that illuminates the scene 360. For example, the SL incident on the object 350 may be attenuated relative to the SL incident on the object 355. For a given cell of the liquid crystal array 384, the brightness or illumination intensity of the SL emitted by the cell is controlled based in part on the difference in the crystal orientation of the liquid crystal cell and the specific polarization orientation of the output polarizer 386. For instance, if the difference in the crystal orientation of the liquid crystal and the specific polarization orientation of the output polarizer 386 is 45°, the output of the SL illuminator 365 is reduced by approximately 50%. In some embodiments, the output polarizer 386 is positioned to be aligned with the polarization of the light generated by the source assembly 380. In other embodiments, the output polarizer 386 is position to be aligned with some other orientation.

The protective window 388 provides a path for the SL to exit the SL illuminator 365 assembly and protects the inner components of the SL illuminator 365 assembly. In some embodiments, the protective window 388 is made of a transparent material (e.g., a transparent glass or plastic). In alternate embodiments, the output polarizer 386 is the protective window 388.

In alternate embodiments (not shown), the SL illuminator 365 further includes an input polarizer between the SL element 382 and the liquid crystal array 384. In some embodiments, the input polarizer is located between the source assembly the 380 and SL element 382. The addition of an input polarizer between the SL element 382 and the liquid crystal array 384 may improve the quality of the SL, but may also increase the size and/or weight of the SL illuminator 365. Having an input polarizer increases the polarization ratio of the light generated by the source assembly 380 before the light passes through the liquid crystal array 384. The input polarizer filters the components of the light that may leak trough the output polarizer 386.

The camera 370 captures images of the scene 360. The camera 370 is configured to capture images at least in the same spectrum as the SL. The camera 370 may also be sensitive to light having visible wavelengths as well as light having infrared wavelengths or wavelengths in other portions of the electromagnetic spectrum. In some embodiments, the camera 370 comprises a charge coupled device (CCD), a complementary metal-oxide-semiconductor (CMOS) imager, other light sensitive device, or some combination thereof.

The controller 375 analyzes one or more of the captured images to determine whether any portions of the analyzed images were saturated by the SL. In some embodiments, the controller 375 analyzes an image by identifying pixel values in the image that are associated with the SL and have a brightness value higher than a threshold value. The threshold may be e.g., 85% of a maximum brightness value of a pixel or some other value close to the maximum brightness value. If no pixels are identified, the intensity of the SL across the scene does not result in saturation. In contrast, if one or more portions of the image are identified as having saturated pixels, the controller 375 instructs the SL illuminator 365 to attenuate specific portions of the emitted SL that correspond to the identified one or more portions of the SL in the image. Some detectors can provide for quick row-by-row designation of saturation to minimize any latency in the feedback cycle.

The controller 375 determines an attenuation factor that identifies specific cells of the liquid crystal array 384 and amounts of rotation of the polarization to apply to each of the specified cells. The controller 374 determines the attenuation factor by (1) identifying cells in the liquid crystal array 384 that correspond with the identified saturated pixels in the image, and (2) determining an amount of rotation of polarization for each of the identified cells that would cause a corresponding attenuation in the emitted SL such that a subsequent image frame is not saturated. In some embodiments, the amount of rotation is incremental (e.g., an amount corresponding to a 10% attenuation of the emitted SL). In other embodiments, the controller 375 determines the amount of rotation based on other information from the image captured by the camera 370, like, e.g., a size of a structured light element (e.g., a dot), the separation between structured light elements in comparison to knowledge of the scene depth/reflectivity profiles (and user predicted motion), a signal-to-noise (SNR) ratio of the image, or some combination thereof. In some embodiments, the controller 375 determines an amount of rotation for each identified cell that would result in the corresponding pixel having a maximum signal or close to the maximum signal—but not saturating. An effect of which is to increase SNR in subsequently captured images of the SL without saturating the SL in those images. Additionally, in some embodiments, the attenuation factor identifies for every cell of the liquid crystal array 384 a respective amount of rotation (e.g., 0 to 90 degrees).

Additionally, in some embodiments, portions of the emitted SL to attenuate (i.e., specific cells in the liquid crystal array 384) are determined based on a predictive model. For instance, the controller 375 may determine which cells in the liquid crystal array 384 correspond with the identified saturated pixels based on previously captured images. The controller 375 determines an amount of shift in a saturated portion between subsequent images, and predicts a probability of the saturated portion being in a future location based on the shift. The controller 375 then instructs the SL illuminator 365 to attenuate the portions of the SL if the probability is greater than a set value (e.g., 75%). The probability may be determined based on a machine-learning algorithm. For instance, the machine-learning algorithm may take as an input an identification of portions that are currently saturated, an identification of the portions that were previously saturated, and determine a probability value for regions that are adjacent to the currently saturated portions. In other embodiments, the controller 375 instructs the SL illuminator 365 to attenuate regions that are adjacent to the currently saturated portions within a pre-set distance, and utilizing knowledge of the AR/VR headset tracking information, which can include prediction in the next frames line-of-sight movement.

The controller 375 instructs the SL illuminator 365 to attenuate the emitted SL in accordance with the determined attenuation factor. For example, for a given attenuation factor that identifies specific cells of the liquid crystal array 384 and a specific attenuation for those cells, the controller 375 instructs the SL illuminator 365 to change the crystal orientation of specific cells such that the emitted SL from these cells is attenuated.

For example, the scene 360 includes objects 350 and 355 that reflect incident SL projected by the SL illuminator 365. The brightness of the objects 350 and 355 may vary due to, e.g., distance from the DCA 120, reflectivity of the respective object, etc. A first captured image of the scene 360 may show that the SL reflected from the object 350 is saturated, whereas the SL reflected from the object 365 is not saturated. The controller 375 determines that the portion of the image corresponding to the object 350 is saturated, and then determines an attenuation factor specific to that portion of the image. The attenuation factor identifies one or more pixels in the liquid crystal array 384 that transmit SL that is incident on the object 350, and an amount of polarization rotation for each of the specified cells that would cause a corresponding attenuation in the emitted SL such that a subsequent image of the object 350 is not saturated. The SL illuminator 365 then emits light in accordance with the attenuation factor—such that SL incident on the object 350 is attenuated relative to the SL incident on the object 355. Accordingly, the objects 350 and 355 are not saturated in a subsequent image of the scene 360 and the entire image may be used to determine depth information (e.g., by a AR console 110) to a higher degree of confidence and fidelity.

In alternate embodiments that include the AR console 110, the controller 375 sends images captured by the camera 370 to the AR console 110 and receives a message from the AR console 110 identifying the specific portions of the SL to attenuate and/or the attenuation factor. Based on the received message from the AR console, the controller 375 may instruct the SL illuminator 365 to change the crystal orientation of specific cells of the liquid crystal array 384 to attenuate the portions of the SL associated with the specific cell.

Figure 4:
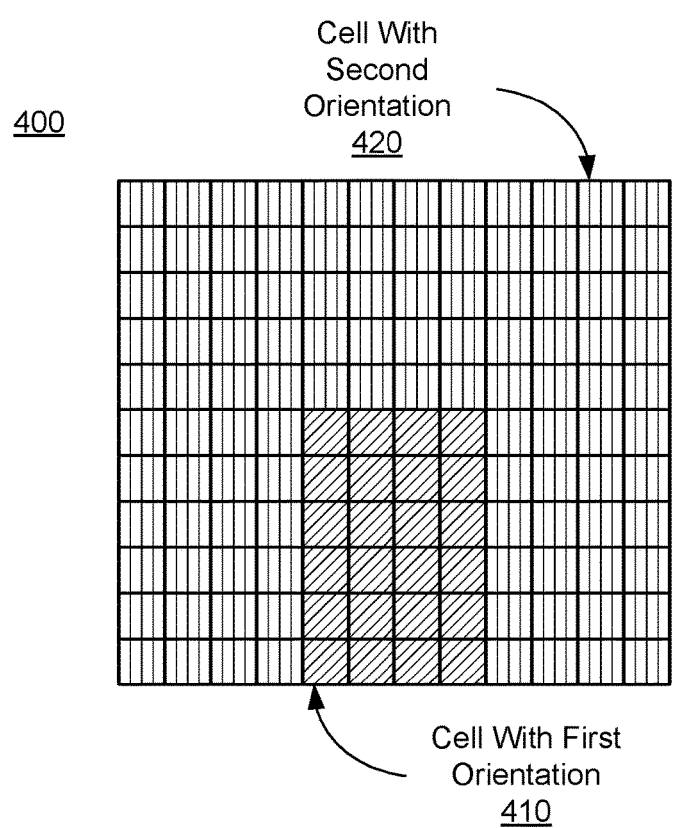
FIG. 4 illustrates an example setting of a liquid crystal array, according to an embodiment.

FIG. 4 illustrates an example setting of a liquid crystal array 400 (e.g., the liquid crystal array 384), according to an embodiment. In this example, the liquid crystal array 400 is an 11×12 grid of individually addressable liquid crystal cells, however, in other embodiments, the liquid crystal array 410 may have many more cells (e.g., 1000×1000). In this embodiment, the liquid crystal array 410 includes cells at two different polarization states, specifically, cells 410 oriented 45° with respect to an orientation of a polarizer (e.g., polarizer 386), and cells 420 parallel with the orientation of the polarizer.

Figure 5B:
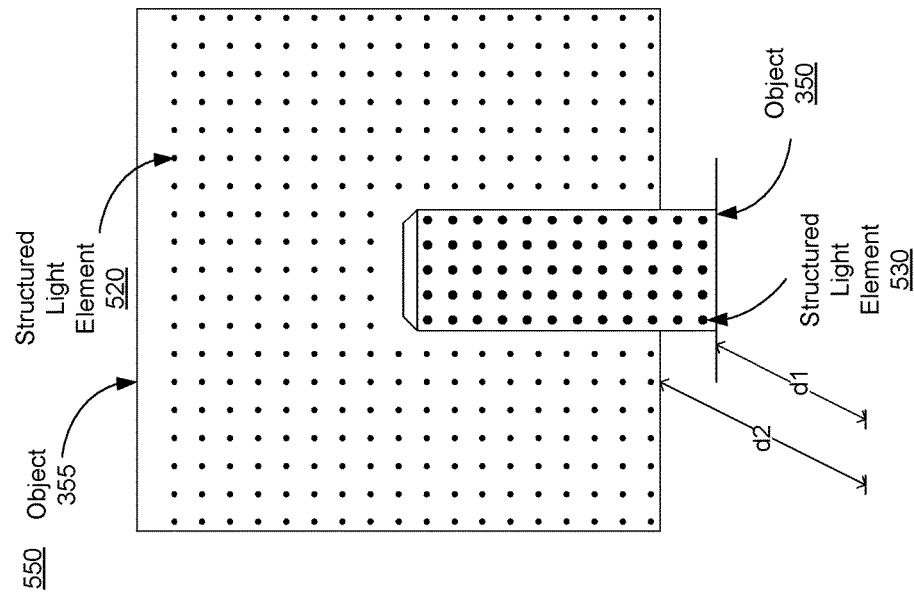
FIG. 5B illustrates an image of a scene after illumination intensity adjustment, according to an embodiment.
Figure 5A:
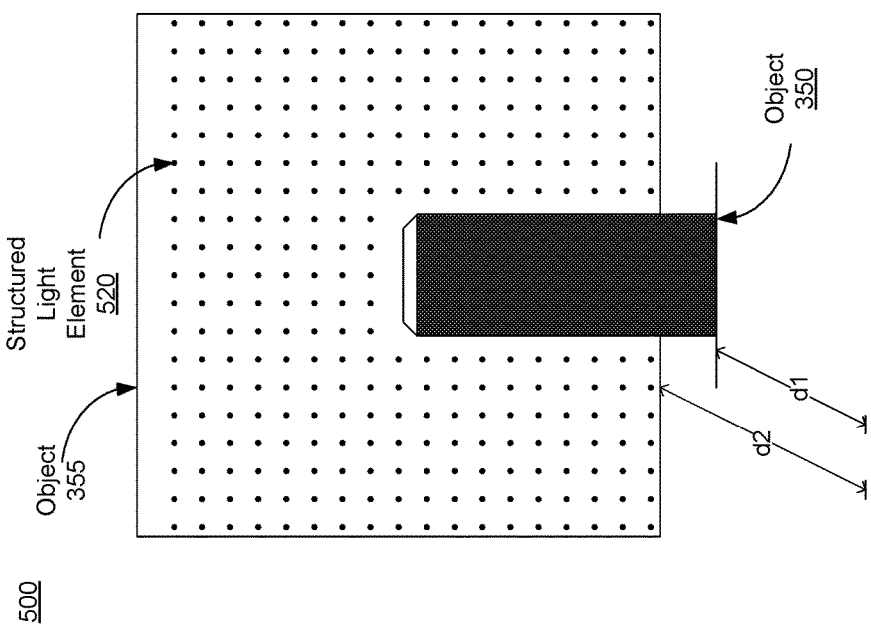
FIG. 5A illustrates an image of a scene that includes objects as captured by a depth camera assembly, according to an embodiment.

FIG. 5A illustrates an image 500 of the scene 360 that includes the object 350 and the object 355 as captured by the DCA 120, according to an embodiment. In the image 500 the portion of the SL that is reflected by the object 350 is saturated. In a saturated environment a SL element is not resolvable. For example, a SL element 520 on the object 355 is clearly resolvable from adjacent structured light elements. In contrast, the SL elements are not resolvable on the object 350. Accordingly, details of the structured light elements on the object 350 are not clear and this may have a negative impact on determining depth determination for that area.

FIG. 5B illustrates an image 550 of the scene 360 after illumination intensity adjustment, according to an embodiment. Portions of the emitted SL that are incident on the object 350 are attenuated in accordance with an attenuation factor that causes a liquid crystal array (e.g., 400) to adjust polarization in a manner similar to that shown in FIG. 4.

In the image 550, the SL reflected from the objects 350 and 355 are not saturated. For example, the SL element 520 on the object 355 and a structured light element 560 on the object 350 are clearly resolvable from adjacent structured light elements. Accordingly, details of the structured light elements throughout the image 550 may be used to determine depth determination.

Figure 6:
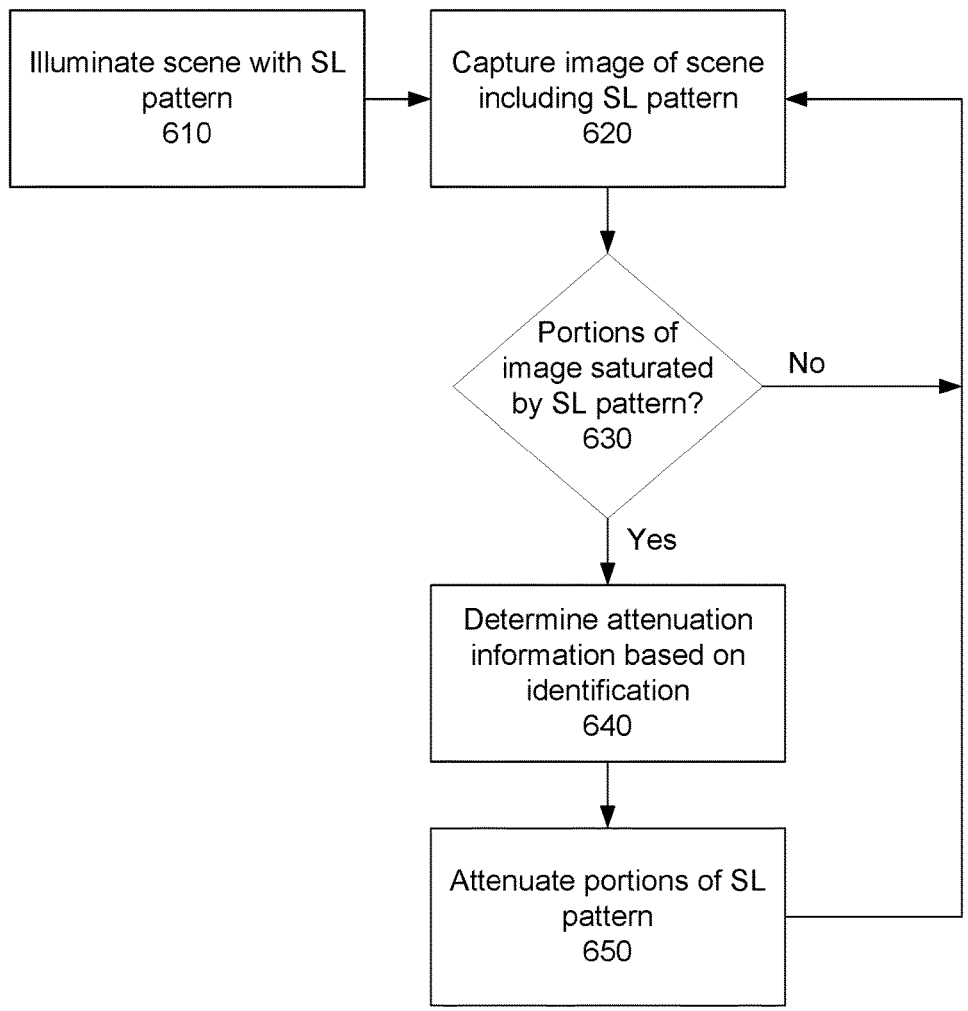
FIG. 6 shows a flow diagram of a process for illumination intensity adjustment of structured light illuminating a scene, according to one embodiment.

FIG. 6 shows a flow diagram of a process 600 for illumination intensity adjustment of SL illuminating a scene, according to one embodiment. The functionality described in conjunction with FIG. 6 may be performed by the DCA 120 or other components in the AR headset 105 in some embodiments. Alternatively, the functionality described in conjunction with FIG. 6 may be performed by other components in the AR system environment 100. Additionally, in some embodiments, the process includes different or additional steps than those described in conjunction with FIG. 6. Moreover, certain embodiments may perform the steps described in conjunction with FIG. 6 in different orders than the order described in conjunction with FIG. 6.

The DCA 120 illuminates 610 a scene with SL and captures 620 an image of the scene including SL generated by the SL illuminator 365.

The DCA 120 determines 630 whether portions of the captured image that are saturated by the SL. For example, the DCA analyzes the captured image to identify any portions of the captured image with a brightness value higher than a threshold value (e.g., 85% of a maximum brightness for a sensor of the imaging capture). If no portions of the captured image are saturated, the process flow moves back to step 620.

If the DCA 120 identifies one or more portions of the captured image that are saturated, the DCA 120 determines 640 an attenuation factor based on the identified portions of the image. The attenuation factor identifies specific portion of the emitted SL for attenuation and an amount of attenuation. The specific portion of the SL correspond to specific cells within a liquid crystal array that would transmit SL that would be incident on areas in the scene where the SL was saturated in the image. The amount of attenuation corresponds to amounts that each of the specific cells rotate a polarization of the light they transmit. The rotated polarization of light in combination with a polarizer result in a specific amount of attenuation of the emitted SL for potentially differing regions of the scene. The amount of attenuation may be, e.g., a fixed amount (e.g. 10% reduction). Alternatively the amount of attenuation may be based on a size of a structured light element (e.g., a dot), the separation between structured light elements, an amount of noise in the image, a signal-to-noise (SNR) ratio of the image, or some combination thereof.

The DCA 120 attenuates 650 the identified portions of the SL by the determined attenuation factor, and the process flow moves back to step 620.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A depth camera assembly comprising:
   a structured light illuminator configured to illuminate a scene with a variable intensity structured light (SL) pattern, the SL pattern including a plurality of portions and at least one of the portions has a different intensity value than another portion of the plurality of portions, the structured light illuminator comprising:
      a source assembly that generates light,
      a structured light element that generates a SL pattern using the light,
      a liquid crystal array including a plurality of addressable liquid crystal cells, each liquid crystal cell configured to, respectively,
         receive a portion of the SL pattern, and
         modify a polarization state of the portion of the SL pattern in accordance with adjustment instructions,
      a polarizer configured to attenuate portions of the SL pattern based on the polarization of the portions of the SL pattern to generate the variable intensity SL pattern;
   a camera configured to capture an image of the scene illuminated with the variable intensity SL pattern; and
   a controller coupled to the camera and the structured light illuminator, the controller configured to:
      for each of a plurality of portions of the image, determining a saturation factor,
      increase an attenuation factor in response to a saturation factor of a portion of the image being greater than a first threshold value,
      decrease the attenuation factor in response to the saturation factor of the portion of the image being smaller than a second threshold value, and
      control the liquid crystal array based on the attenuation factor.

2. The depth camera assembly of claim 1, wherein the light generated by the source assembly is an infrared light spectrum.

3. The depth camera assembly of claim 1, wherein the liquid crystal array comprises a plurality of independently addressable liquid crystal cells or pixels.

4. The depth camera assembly of claim 1, wherein the controller is further configured to:
   determine an attenuation factor based on three dimensional position information of objects located in front of the SL illuminator and the camera, and
   control the liquid crystal array based on the determined attenuation factor.

5. The depth camera assembly of claim 1, wherein the controller is further configured to:
   increase an attenuation factor in response to a signal-to-noise ratio (SNR) in a portion of the image being greater than a first threshold value;
   decrease the attenuation factor in response to the SNR in the portion of the image being smaller than a second threshold value; and
   control the liquid crystal array based on the attenuation factor.

6. The depth camera assembly of claim 1, wherein the liquid crystal array is positioned at least 3 millimeters away from the structured light element.

7. The depth camera assembly of claim 1, wherein the structured light element generates a structured light pattern comprising a plurality of dots, and wherein each liquid crystal cell of liquid crystal array corresponds to one dot of the plurality of dots of the structured light pattern.

8. The depth camera assembly of claim 1, wherein the structured light element generates a structured light pattern comprising a plurality of dots, and wherein at least one liquid crystal cell of liquid crystal array corresponds to multiple dots of the plurality of dots of the structured light pattern.

9. The depth camera assembly of claim 1, wherein the depth camera assembly is part of a head-mounted display.

10. A head-mounted display (HMD) comprising:
an electronic display configured to emit image light; and
a depth camera assembly, the depth camera assembly comprising:
  a structured light illuminator configured to illuminate a scene with a variable intensity structured light (SL) pattern, the SL pattern including a plurality of portions and at least one of the portions has a different intensity value than another portion of the plurality of portions, the structured light illuminator comprising:
    a source assembly that generates light,
    a structured light element that generates a SL pattern using the light,
    a liquid crystal array including a plurality of addressable liquid crystal cells, each liquid crystal cell configured to, respectively,
      receive a portion of the SL pattern, and
      modify a polarization state of the portion of the SL pattern in accordance with adjustment instructions,
    a polarizer configured to attenuate portions of the SL pattern based on the polarization of the portions of the SL pattern to generate the variable intensity SL pattern;
  a camera configured to capture an image of the scene illuminated with the variable intensity SL pattern; and
  a controller coupled to the camera and the structured light illuminator, the controller configured to:
    for each of a plurality of portions of the image, determining a saturation factor,
    increase an attenuation factor in response to a saturation factor of a portion of the image being greater than a first threshold value,
    decrease the attenuation factor in response to the saturation factor of the portion of the image being smaller than a second threshold value, and
    control the liquid crystal array based on the attenuation factor; and
an optics block configured to direct the image light to an exit pupil of the HMD corresponding to a location of an eye of a user of the HMD.

11. The head-mounted display of claim 10, wherein the liquid crystal array of the depth camera assembly comprises a plurality of independently addressable liquid crystal cells or pixels.

12. The head-mounted display of claim 10, wherein the controller of the depth camera assembly is further configured to:
increase an attenuation factor in response to a signal-to-noise ratio (SNR) in a portion of the image being greater than a first threshold value;
decrease the attenuation factor in response to the SNR in the portion of the image being smaller than a second threshold value; and
control the liquid crystal array based on the attenuation factor.

13. The head-mounted display of claim 10, wherein the liquid crystal array of the depth camera assembly is positioned at least 3 millimeters away from the structured light element.

14. The head-mounted display of claim 10, wherein the structured light element of the depth camera assembly generates a structured light pattern comprising a plurality of dots, and wherein each liquid crystal cell of liquid crystal array corresponds to one dot of the plurality of dots of the structured light pattern.

15. The head-mounted display of claim 10, wherein the structured light element of the depth camera assembly generates a structured light pattern comprising a plurality of dots, and wherein each liquid crystal cell of liquid crystal array corresponds to multiple dots of the plurality of dots of the structured light pattern.

16. A method, comprising:
illuminating a scene with a variable intensity structured light (SL) pattern that is part of a head-mounted display;
capturing an image of the scene illuminated with the variable intensity SL pattern;
identifying portions of the captured image that are saturated;
increasing an attenuation factor of a first portion of the image in response to a signal-to-noise ratio (SNR) in of the first portion of the image being greater than a first threshold value;
decreasing the attenuation factor of a second portion of the image in response to the SNR of the second portion of the image being smaller than a second threshold value; and
attenuating portions of the variable intensity structured light pattern based on the attenuation factor.

17. The method of claim 16, wherein identifying portions of the captured image that are saturated comprises:
identifying portions of the captured image that have a brightness or signal value higher than a threshold value.

* * * * *